US010469601B2

(12) United States Patent
Lewis et al.

(10) Patent No.: US 10,469,601 B2
(45) Date of Patent: *Nov. 5, 2019

(54) CONTENT MANAGEMENT APPARATUS

(75) Inventors: Marc Samuel Lewis, London (GB); Christopher Simon Gorman, Renfrewshire (GB); Nicholas R. C. G. Lycett, London (GB)

(73) Assignee: NOW TECHNOLOGIES (IP) LIMITED, London (GB)

(*) Notice: Subject to any disclaimer, the term of this patent is extended or adjusted under 35 U.S.C. 154(b) by 990 days.

This patent is subject to a terminal disclaimer.

(21) Appl. No.: 13/695,413

(22) PCT Filed: Apr. 28, 2011

(86) PCT No.: PCT/GB2011/050855
§ 371 (c)(1),
(2), (4) Date: May 13, 2013

(87) PCT Pub. No.: WO2011/135379
PCT Pub. Date: Nov. 3, 2011

(65) Prior Publication Data
US 2013/0232189 A1    Sep. 5, 2013

Related U.S. Application Data

(63) Continuation-in-part of application No. 12/772,058, filed on Apr. 30, 2010, now Pat. No. 8,930,277.
(Continued)

(51) Int. Cl.
*H04L 29/08* (2006.01)
*G06Q 30/02* (2012.01)
(Continued)

(52) U.S. Cl.
CPC .............. *H04L 67/22* (2013.01); *H04L 47/70* (2013.01)

(58) Field of Classification Search
CPC ......... H04L 67/22; H04L 47/70; G06Q 30/06; G06Q 30/02
See application file for complete search history.

(56) References Cited

U.S. PATENT DOCUMENTS 5,708,961 A    1/1998  Hylton et al.
5,715,403 A    3/1998  Stefik
(Continued)

FOREIGN PATENT DOCUMENTS

CN    1613084 A    5/2005
EP    1134920 A2   3/2001
(Continued)

OTHER PUBLICATIONS

Chilean Office Action dated Nov. 3, 2014 regarding Chilean Application No. 3030-12.
(Continued)

*Primary Examiner* — Nicholas R Taylor
*Assistant Examiner* — Tania M Pena-Santana
(74) *Attorney, Agent, or Firm* — Arent Fox LLP

(57) ABSTRACT

There is disclosed an apparatus configured to provide a chart of content items to a plurality of user devices. The apparatus is configured to enable individual users to temporarily access one or more content items listed in the chart. The apparatus comprises a user device interface configured to communicate with user device applications and a permissions module configured to define user access permissions, including temporary user access permissions, relating to individual ones of the one or more items of content. The apparatus also provides a distribution module configured to implement permissions defined in the permission module in relation to user devices by making available one or more items of content listed in the chart to at least one user device application.

79 Claims, 7 Drawing Sheets

Related U.S. Application Data

(60) Provisional application No. 61/422,048, filed on Dec. 10, 2010.

(51) Int. Cl.
  *G06Q 30/06* (2012.01)
  *H04L 12/911* (2013.01)

(56) References Cited

U.S. PATENT DOCUMENTS

| | | | |
|---|---|---|---|
| 5,946,487 | A | 8/1999 | Dangelo |
| 5,982,900 | A | 11/1999 | Ebihara |
| 6,385,596 | B1 | 5/2002 | Wiser et al. |
| 6,738,766 | B2 * | 5/2004 | Peng ............... G06F 12/121 |
| 7,827,296 | B2 | 11/2010 | Zuckerman et al. |
| 8,392,955 | B2 | 3/2013 | Shaul |
| 8,930,277 | B2 | 1/2015 | Lewis |
| 2001/0047290 | A1 | 11/2001 | Petras et al. |
| 2002/0042730 | A1 | 4/2002 | Homer |
| 2003/0133701 | A1 | 7/2003 | Taira et al. |
| 2003/0231863 | A1 | 12/2003 | Erenberg et al. |
| 2005/0201471 | A1 | 9/2005 | Hannuksela et al. |
| 2006/0069753 | A1 | 3/2006 | Hu et al. |
| 2006/0069857 | A1 | 3/2006 | Lekatsas et al. |
| 2006/0078127 | A1 | 4/2006 | Cacayorin |
| 2006/0107046 | A1 | 5/2006 | Raley et al. |
| 2006/0232449 | A1 | 10/2006 | Jain et al. |
| 2006/0265758 | A1 | 11/2006 | Khandelwal et al. |
| 2006/0271972 | A1 * | 11/2006 | Pai ............... H04N 7/17327 725/86 |
| 2006/0287916 | A1 | 12/2006 | Starr et al. |
| 2006/0288117 | A1 | 12/2006 | Raveendran et al. |
| 2007/0055743 | A1 * | 3/2007 | Pirtle ............... H04L 63/08 709/217 |
| 2007/0073728 | A1 | 3/2007 | Klein et al. |
| 2007/0083730 | A1 | 4/2007 | Vorbach et al. |
| 2007/0089174 | A1 | 4/2007 | Bader et al. |
| 2007/0162571 | A1 | 7/2007 | Gupta et al. |
| 2007/0162611 | A1 | 7/2007 | Yu et al. |
| 2007/0226365 | A1 * | 9/2007 | Hildreth ............... G11B 27/034 709/231 |
| 2007/0247979 | A1 | 10/2007 | Brillon et al. |
| 2007/0266446 | A1 | 11/2007 | Aaron |
| 2008/0010372 | A1 | 1/2008 | Khedouri et al. |
| 2008/0022340 | A1 | 1/2008 | Hannuksela et al. |
| 2008/0066181 | A1 | 3/2008 | Haveson et al. |
| 2008/0184359 | A1 | 7/2008 | Khedouri et al. |
| 2008/0187115 | A1 | 8/2008 | Khedouri et al. |
| 2008/0201376 | A1 | 8/2008 | Khedouri et al. |
| 2008/0249961 | A1 | 10/2008 | Harkness et al. |
| 2008/0288365 | A1 | 11/2008 | Fisher et al. |
| 2008/0288411 | A1 | 11/2008 | Copley |
| 2009/0049074 | A1 | 2/2009 | Dara-Abrams et al. |
| 2009/0150786 | A1 * | 6/2009 | Brown ............... G06F 17/30035 715/733 |
| 2009/0160859 | A1 * | 6/2009 | Horowitz ............... G06T 11/206 345/440 |
| 2009/0164801 | A1 | 6/2009 | Kawahara |
| 2009/0171715 | A1 | 7/2009 | Conley et al. |
| 2009/0271492 | A1 * | 10/2009 | Fein ............... G06F 17/30017 709/212 |
| 2009/0313344 | A1 | 12/2009 | Beyme et al. |
| 2010/0031366 | A1 | 2/2010 | Knight et al. |
| 2010/0226444 | A1 | 9/2010 | Thevathasan et al. |
| 2010/0255812 | A1 | 10/2010 | Nanjundaiah |
| 2011/0015968 | A1 | 1/2011 | Carlson |
| 2011/0058675 | A1 | 3/2011 | Brueck et al. |
| 2011/0119233 | A1 | 5/2011 | Reddy |
| 2011/0136493 | A1 * | 6/2011 | Dimpflmaier ............... H04B 17/26 455/450 |
| 2011/0153751 | A1 | 6/2011 | Rice |
| 2011/0196865 | A1 * | 8/2011 | Eggink ............... G06F 17/30702 707/732 |
| 2011/0202430 | A1 * | 8/2011 | Narayanan ............... G06Q 10/10 705/27.1 |
| 2012/0023201 | A1 | 1/2012 | Gideon |
| 2012/0035937 | A1 * | 2/2012 | Kim ............... G10L 19/0204 704/500 |
| 2012/0239763 | A1 * | 9/2012 | Musil ............... G06Q 50/01 709/206 |
| 2012/0254927 | A1 | 10/2012 | Kim |
| 2012/0259700 | A1 * | 10/2012 | Hellal ............... G06Q 30/02 705/14.53 |
| 2012/0307655 | A1 | 12/2012 | Vyrros et al. |
| 2013/0006868 | A1 | 1/2013 | Hawkes |
| 2013/0018961 | A1 | 1/2013 | Svendsen |
| 2013/0030956 | A1 | 1/2013 | Kim |
| 2013/0097302 | A9 | 4/2013 | Khedouri et al. |

FOREIGN PATENT DOCUMENTS

| | | |
|---|---|---|
| EP | 1134920 | 9/2001 |
| JP | H11191834 A | 7/1999 |
| JP | 2001184292 A | 6/2001 |
| JP | 200216899 A | 1/2002 |
| JP | 200226843 A | 1/2002 |
| JP | 200262882 A | 2/2002 |
| JP | 200315665 A | 1/2003 |
| JP | 200478584 A | 3/2004 |
| JP | 2004145538 A | 5/2004 |
| JP | 2004220357 A | 8/2004 |
| JP | 2005327265 A | 11/2005 |
| JP | 2006146303 A | 6/2006 |
| JP | 2006203505 A | 8/2006 |
| JP | 2007206988 A | 8/2007 |
| JP | 2007264798 A | 10/2007 |
| JP | 200964171 A | 3/2009 |
| JP | 200987065 A | 4/2009 |
| WO | 2002089439 A2 | 11/2002 |
| WO | WO-2002/089439 | 11/2002 |
| WO | WO2002057890 | 11/2002 |
| WO | 2003009166 A1 | 1/2003 |
| WO | WO-2003/009166 | 1/2003 |
| WO | 2003058537 A1 | 7/2003 |
| WO | WO2006099407 | 9/2006 |
| WO | WO2007089092 | 8/2007 |
| WO | 2009065060 A1 | 5/2009 |
| WO | 2009150439 A1 | 12/2009 |
| WO | WO2013075020 | 5/2013 |

OTHER PUBLICATIONS iTunes, (Apple Inc.) 2000, release date of Apple iTunes Version 1.0—Jan. 9, 2001, website: http://en.wikipedia.org/wiki/ITunes_version_history.
EP Office Action dated Feb. 18, 2015, regarding EP11720839.7.
Japanese Office Action dated Jan. 21, 2015, regarding JP2013-506758, and English translation.
Mexico Office Action dated Jan. 11, 2015, regarding Mexico Application MX/a/20121012690, and English translation.
M. Tungare, et al., XP002542514, "Thinking Outside the (Beige) Box: Personal Information Management Beyond the Desktop," Proc. Personal Information Management: PIM 2008, CHI 2008 Workshop.
International Search Report regarding PCT Application No. PCT/GB2009/001506, dated Sep. 4, 2009.
Written Opinion regarding Singapore Application No. 201207935-6, dated Jan. 30, 2014.
Official Action from Patent Office of Russian Federation, dated Apr. 24, 2015, regarding Russian Application No. 2012146117.
Indonesian Office Action dated May 25, 2015, regarding Indonesian Application No. WO0201204389.
International Search Report dated Dec. 23, 2010 regarding PCT/US2010/054047.
International Preliminary Report on Patentability dated May 1, 2012 and Written Opinion dated Dec. 23, 2010 regarding PCT/US2010/054047.
International Search Report for International Application No. PCT/GB2011/050855, dated Aug. 23, 2011, 3 pages.

(56) References Cited

OTHER PUBLICATIONS

First Office Action dated Jun. 26, 2015, regarding China Application No. 201180032692.2.
Written Opinion for International Application No. PCT/GB2011/050855, dated Aug. 23, 2011, 4 pages.
Canadian Office Action dated Nov. 7, 2017, regarding Canadian Application No. 2797764.
Summons to Attend Oral Proceedings (and Annex) dated Nov. 29, 2017, regarding EP Application No. EP11720839.7.

* cited by examiner

CONTENT MANAGEMENT APPARATUS

CROSS-REFERENCE TO RELATED APPLICATIONS

This application is a United States National Stage Application under 35 U.S.C. § 371 of International Patent Application No. PCT/GB2011/050855, filed Apr. 28, 2011, which claims the benefit to U.S. Provisional Application No. 61/422,048, filed Dec. 10, 2010, and U.S. patent application Ser. No. 12/772,058, filed Apr. 30, 2010, each of which is incorporated by reference into this application as if fully set forth herein.

TECHNICAL FIELD

This invention relates to apparatus and method for providing a chart of content to a user device and controlling at least temporary access of the user device to content items listed in the chart.

BACKGROUND

In general, a chart may be a simple list of content items in no particular order. Examples of items include music and other audio content, video items, text files and more. In some embodiments described in more detail below, the term "chart" refers to a ranking of content according to popularity over a given period of time or according to editorial expertise. Examples of popularity charts published in the music industry include: the Billboard 100, MW Club Charts, Hot 100 or Top 40. Charts exist for other types of content such as books (including audio books), journals, games audio, visual and social/community based educational services, lessons and courses capable of being supported with physical, printed and online materials and much more and the term used herein is not intended to be limited to music unless expressly so limited. Charts may be compiled for example on different measures of popularity, different chapters read or different modules completed, for example retail purchases, download or streaming.

In some embodiments described in more detail below, content items are referred to as "tracks". The term "tracks" is not limited to music tracks unless expressly so limited and also encompasses other audio content, video items, text files and other consumable content.

SUMMARY

According to an aspect of the present invention, there is provided an apparatus configured to provide a chart of content items to a plurality of user devices and configured to enable individual users to temporarily access one or more content items listed in the chart, the apparatus comprising: a user device interface configured to communicate with user devices applications; a permission module configured to define user access permissions, including temporary user access permissions, relating to individual ones of the one or more items of content; and a distribution module configured to implement permissions defined in the permission module in relation to user devices by making available to a user one or more items of content listed in the chart via the at least one user device application.

Thus in one aspect content may be delivered to mobile devices such as phones, iPads™, tablets and other mobile data connected devices as curated (pre-selected) package of content in advance of use.

The package of content may be pre-selected by an external agency (for example a disk jockey in the case of musical content) so that the user is presented with attractive content but need not be required to pre-select on a track by track basis. Individual content items are preferably identified and may have metadata associated with them for the convenience of the user.

The content is preferably delivered during off-peak network usage periods, which the end-user is then able to play without further network data access being required. In one implementation this is then updated daily to provide the end user with a forever fresh 'Soundtrack to Your Day'. Other implementations might provide chapters or verses from selected authors. Numerous other examples of providing regular content to users are possible.

As will be explained in more detail below, the management of individual device constraints, off-peak periods and automatic sensing of available bandwidth may also be automatically handled.

In one aspect the apparatus may be thought of as providing curated lists of content. A content provider can therefore provide content to the apparatus secure in the knowledge that any permissions that it or any other party wishes to exercise over the content will be applied.

In one embodiment, the apparatus is configured to automatically update the chart accessible to a user device during low levels of network traffic. For example, it may be configured to automatically update the chart accessible to a user device during the night, the content items making up the chart then being playable according to the permissions applying irrespective of current location or signal strength. In one embodiment, the apparatus is configured to serve a number of different local jurisdictions each with night-time updates configured to occur across a different time zone.

Preferably, the permissions module defines temporary availability to a user of at least one content item in a chart in terms of one or more of: number of plays (for example including number of streams); number of shares; and duration of availability to the user. Each of these might be regarded as a consumption event, although the list is not intended to be limited. Other forms of consumption events include viewing of images or text, which might be detected from the images or text being rendered on a screen. Audio content might be consumed by using it to create a ringtone on a device, which is one form of playing the content. In the example of a ringtone the applicable permission might limit the number of times it can be used and this can be detected on a device. Other forms of consumption event will be apparent to those skilled in the art.

In the specific examples to be described below listening to a content item is specifically described. It will be appreciated that many of these examples are also applicable to other forms of content consumption.

The user access permissions may be based on the location of the user. Thus it is possible for restrictions to be placed on how content is used depending on where the user is.

Preferably, the permissions module defines temporary availability to a user of at least one content item in a chart and is configured to update the permissions module responsive to the chart being updated. In certain embodiments, the default permissions for each of a plurality of subscription classes are set up for each track or each individual content item in the chart or list. It is possible for the default permissions to be deviated from in the case of individual users in dependence upon consumption event data associated with the individual user.

One embodiment comprises at least one sharing interface configured to implement sharing of content items from a first user to a second user according to permission set in the permissions module. Preferably, the sharing occurs between end user devices, directly or via the apparatus. In such cases, the sharing interface may be configured to operate via one or more of: a social network; and an email client. In certain embodiments, the sharing interface is configured to carry a message or link establishing content item permissions for a user of the system.

In the disclosed embodiment, permissions established via the sharing interface comprise one or more of: number of plays; number of streams; number of shares; and duration of availability to the user.

In another embodiment, users are enabled to send messages to each other via the apparatus, and a research data module comprises a sentiment engine configured to monitor behavior and/or message content for sentiment connected to a content item.

The apparatus may additionally be configured to enable users to send messages to each other via a sharing interface.

In another embodiment, the apparatus also discloses a research module coupled to the user device application, wherein the research module is configured to receive from the user application metrics comprising one or more of: number of purchases by track; number of plays by track; ratio of plays to purchases by track; duration of play by track; sharing by track; who is sharing; ratio of shares to purchases; timing of plays; duration of use of user application; geographical stamps; average number of plays of a track by a user; sentiment of messaging in relation to a track.

Importantly the research data module is able to collect information from multiple users whereby information relating to the consumption of content may be provided to an organisation that requires it, such as a performing rights society (PRS). This may be used by the PRS for various purposes including checking that any due royalties are paid.

In such cases, the apparatus may additionally comprise one or more of a retail module and a purchase module configured to couple to and receive data from the user device application.

In certain embodiments, the apparatus is configured to convert a content item of the chart from a state of temporary availability on the user device to a state of permanent availability on the user device responsive to a trigger event. A trigger event may include for example one or more of: a purchase event; a reward; and an alteration of permissions data.

Preferably, the apparatus is configured to convert a content item from a state of temporary availability to a state of permanent availability by one or more of: supplying from the apparatus to the user application a version of the content item in a format recognized by commercially available content players; changing a file extension such that the content item can be recognized by commercially available content players; converting the content item file from a secure format to a format recognized by commercially available content players; decrypting the content item; re-constituting the content item in a format recognized by commercially available content players. This list is not intended to be exhaustive.

Embodiments generally also include a payment module operable to accept payments. Payments may be by any method including one or more of: a financial card; mobile phone account; and internet payment system. Specific examples of currently available payment methods include PSMS, MPay, PayForIt, PayPal™ and e-wallets and the service is adaptable so that future recognized payment methods can be included and offered to both new and existing customers if necessary.

Embodiments generally also include a chart interface configured to enable communication with one or more chart providers. In such cases, the distribution module may be configured to receive the chart from one or more chart providers.

Certain embodiments may be configured to change a format of an item of content data responsive to a trigger event. This may be used for example to convert an item of content held at the user device from a temporary availability to a permanent availability.

Some embodiments comprise a fragmentation module configured to encrypt the one or more items of content data prior to transferring the one or more items of content data together with an encryption key to the at least one user device. The fragmentation module may be configured to fragment each of the one or more items of content data into a plurality of components. Each component may for example relate to a different recorded frequency range.

In one embodiment, there is provided an apparatus configured to record a user level record of consumption events. In such cases, the apparatus may be additionally configured to automatically adjust one or more of (i) access permissions applying to an individual user and (ii) pricing of content to an individual user, in dependence upon consumption event data of that individual user. In addition records of consumption events may be used to select individuals or groups of individuals for particular treatment. For example, an individual or group of individuals might be sent an offer for discount, voucher or free gift redeemable in a (physical or online) store. This might be communicated to individuals in any suitable manner such as SMS, email, directly into an application running on a user device or by other suitable means. In a further development, users might be provided with ID whereby their store purchases, preferably in designated participating stores, can be associated with their ID and they can then be rewarded. A reward might take the form of extra content or extra rights over content already delivered.

Groups or individuals might be selected for similar particular treatment on other bases such as membership of a social or other group, geographical location, type of device owned (for example as part of a device promotion) and many others as will be apparent to persons skilled in the art. These bases may be used in combination with data from user level records to select individuals or groups of individuals.

The user level record of consumption events may include data on events selected from one or more of: tagging; play content; download content, play sample of content; download sample of content; share with network contact; message to network contact; make commentary on content; purchase content; and receive any of the aforementioned from a network contact.

There are provided certain embodiments wherein a recorded consumption event contributes to a score indicative of consumer response to the consumed content item.

Preferably, a score has contributions from consumption events selected from one or more of the following: tagging; play content by stream; download, play sample of content; download sample of content; share; message to network contact; make commentary on content; purchase; and receive any of the aforementioned from a network contact.

Certain embodiments are configured to automatically generate reports based on pluralities of said scores.

The lapse or expiry of permission to access content, for example due to a subscription lapsing, may be handled in a number of ways. One possibility is to continue to provide to a user with reduced or no access permissions a chart of content items but not to provide any content or to provide reduced content. For example if a user has already purchased one or more content items, the user could be provided with updates of one or more charts in which the content item(s) are present. The user might have the option to click or otherwise select an item in a chart and in response be presented with a reminder to renew a subscription or other permission to consume the content. It would be possible to provide with charts samples of content instead of complete content items.

At least part of the apparatus described above may be implemented in an application running on a mobile device. Thus in another aspect there is provided a method in a mobile device comprising: accessing a chart listing one or more content items provided on remote apparatus; accessing permission data relating to at least one of the content items in the chart defining how the at least one content item may be used by a user of the device; monitoring use of the at least one of the content items by a user of the device; and controlling use of the at least one of the content items according to the permission data.

Thus an application running on the device, typically provided for accessing the chart, ensures that permissions relating to the use of content items are complied with.

The permission data may relate to the location of the user in which case the method includes receiving data relating to the location of the user (e.g. from a GPS module) and using this data in the control of the use of the at least one of the content items.

As noted above the permission data may defines one or more of:

how the user can play the content item, whether the user is allowed to share the content item with other users and if so optionally how many users, number of times the user is allowed to play the content item, and time period during which the user is allowed to play the content item.

The method may include recording consumption data relating to the at least one content item, the consumption data comprising numbers of consumption events, the consumption events comprising one or more of the group comprising: playing whole content item, downloading whole content item, playing sample of content item, downloading sample of content item, sharing content item, sending message relating to content item, making commentary on content item, purchasing content item, and receiving any of the foregoing from a network contact. This consumption event data may then be transmitted to the remote apparatus, i.e. the apparatus that supplied the chart. It can then be analysed along with data from other devices.

The at least one content item may be stored on the device such that it is accessible only in accordance with the permission data for the at least one content item.

The at least one content item is typically received in a state of temporary availability. A content item of the chart is then converted from a state of temporary availability on the user device to a state of indefinite availability on the user device responsive to a trigger event. The device might recognize as a trigger event one or more of: a purchase event; a reward; and an alteration of permissions data.

The conversion performed on the device may comprise one or more of: supplying from the apparatus to the user application a version of the content item in a format recognized by commercially available content players; changing a file extension such that the content item can be recognized by commercially available content players; converting the content item file from a secure format to a format recognized by commercially available content players; decrypting the content item; re-constituting the content item in a format recognized by commercially available content players.

In one embodiment the device receives at least one content item in fragmented form and reconstructs the item to enable it to be played on the device. In this case the device then preferably receives, separately from the at least one content item, a key defining how the content item should be reconstructed.

The user may be provided with an option to tag a content item and is then provided with reminders relating to the tagged item, usually via a user interface of the device. Tagging of an item may be one of the consumption events that is monitored and notified to the remote apparatus.

Content items from the chart for which there are no usage restrictions may be stored separately from content items for which use is restricted. For example, items to which restrictions apply may be stored in memory dedicated to the chart application and "unrestricted" items may be stored in the general device memory.

The device may provide for multiple levels of access by a user to one or more charts at the remote apparatus, as will be described in more detail below.

The device may also permit multiple users to use the at least one content item. For example different users may be identified by different input identity information (e.g. password) and the use by each user may be monitored. The permissions may then be granted on a per user rather than per device basis.

The chart itself may be downloaded to the device. The permission data is preferably embedded in the chart, otherwise it may be downloaded separately. Updates or further charts can be sent to the device either automatically (e.g knowing the user's preferences) or in response to a request from the device.

The device may perform a battery level check and only request and/or or download a chart and/or update at a time when its battery level is above a certain threshold.

The device may request and/or download a chart and/or update only at times the network traffic levels are known to be below a certain threshold.

The device may check the network traffic level and request and/or download a chart only at times the network traffic levels are below a certain threshold.

The content item itself may be downloaded to the device so that it is more readily accessible. In that case, the control of the use of the item may comprise deleting the at least one content item in the event that use of the item is no longer permitted. This might become apparent for example as a result of receiving or accessing updated permission data.

In another aspect there is provided a method in a mobile device comprising: accessing an item provided on remote apparatus, ascertaining the size of the item, ascertaining one or more current operating parameters that affect the ability of the device to download the item, determining whether to download the item based on the size of the item, the current operating parameter(s) and predetermined rules relating to the downloading of items to the device. This method may be performed on any application running on any platform on any mobile device.

It should be noted here that the method described in the foregoing paragraph is not limited to content items. Thus the method is applicable to the downloading of charts as well as downloading of items mentioned in charts, and the downloading of other items to a mobile device.

The one or more operating parameters comprise one or more of: battery level, network traffic level, and available memory capacity.

The method may comprise performing a battery level check and only downloading an item if the battery level is above a certain threshold.

The method may comprise downloading an item only when the network traffic level is known to be below a certain threshold. Alternatively the method may comprise checking the network traffic level and downloading an item only if the network traffic level is determined to be below a certain threshold.

In a preferred embodiment, downloading of the item is associated with an application running on the device and memory capacity on the device is designated to the application. The method may then comprise determining the available memory capacity designated to the application.

The user may have the option to set the amount of memory available for the application. Thus the method may comprise receiving input designating an amount of memory available for the application and reserving this amount of memory to the application.

There is also provided a computer readable medium bearing code which when executed by a processor of a mobile device causes the device to implement the methods described above.

BRIEF DESCRIPTION OF THE DRAWINGS

For a better understanding of the invention and to show how the same may be carried into effect reference will now be made, by way of example only, to the accompanying figures, in which.

DETAILED DESCRIPTION

Reference will now be made in detail to the embodiments of the invention, examples of which are illustrated in the accompanying figures. In the following detailed description, numerous specific details are set forth in order to provide a thorough understanding of the invention. However, it will be apparent to one of ordinary skill in the art that the invention may be practiced without these specific details.

Figure 1:
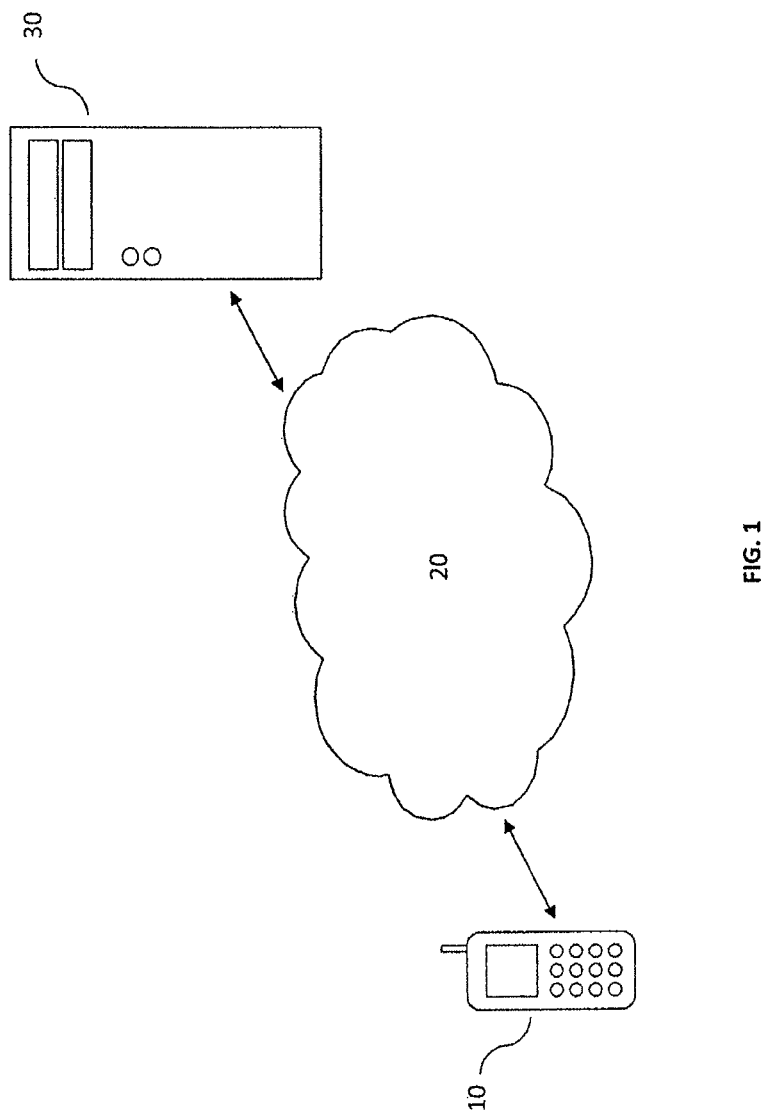
FIG. 1 illustrates schematically an overview of the system.

FIG. 1 illustrates schematically an overview of the system. The system comprises a user device 10. In one embodiment, the user device is a mobile telephone. However, the user device 10 may be any device such as a MP3 player, a lap top computer, a personal digital assistant (PDA), or the like which is provided with a communication interface and music playing capabilities. The user device 10 communicates with a server 30 over the Internet 20 and/or the mobile communication network 20.

A user is able to download an application from the server 30 to the user device 10, or the application may be provided at the user device 10 prior to purchase by the user. Content, for example music content or other content or information, may be embedded within the user application such that some consumable content or other information is available from when the application first arrives on the phone. The application enables the user to view a chart of content, such as a music chart, in one example a top 40 songs chart. The chart may also be a top 10, a top 20 etc. and/or may be based on a genre such as the top 40 R&B songs, the top 40 classical songs, or a branded chart, and may be determined for example based on the number of radio plays, the number of downloads, etc. In addition, the content may be for example music, music videos, movies, TV programmes, user generated clips (such as YOUTUBE™) and the chart may represent the popularity of the content.

Together with being able to view the chart, on a display 170 provided at the user device 10, the user is also provided temporary or permanent content consumption rights in respect of individual content items in the chart according to content consumption permissions defined in a server. The permissions may define one or more of how the user can play the content (e.g. stream and/or download), whether the user is allowed to share the content with other users and how many users, whether the user is allowed to play the content any number of times within a pre-determined period of time (duration of use, such as two days or a week), or whether the number of plays is limited.

In the disclosed embodiment, it is possible to present very targeted, and possibly, exclusive content to the user. For example, if the apparatus 200 knows from subscriber data and/or historical use data that a certain day is the birthday of a particular user, and that the particular user is a JLS fan, then the apparatus can cause transmission of specifically timed content message, for example an exclusive video from JLS wishing the user a happy birthday.

Figure 2:
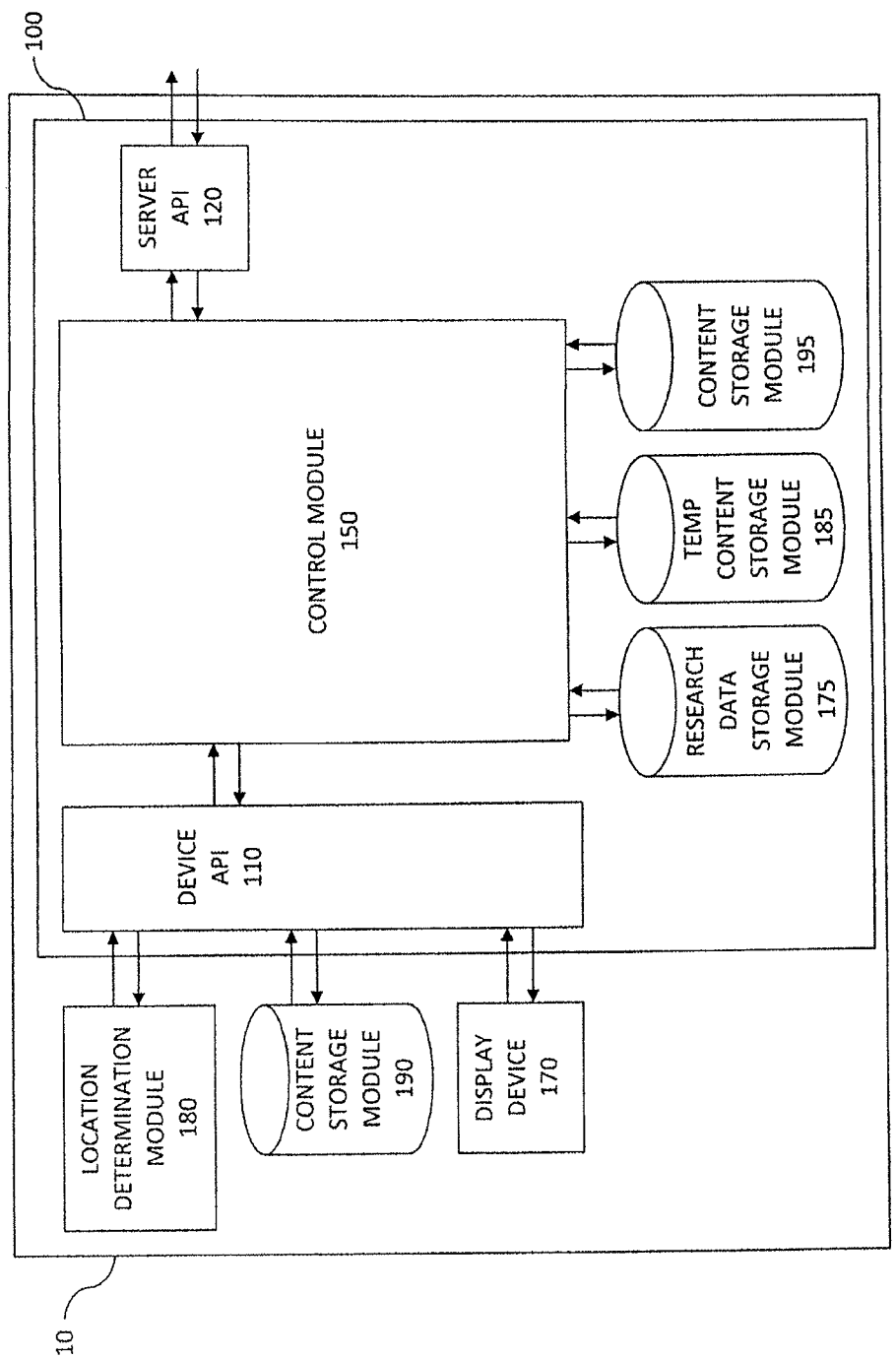
FIG. 2 illustrates schematically apparatus provided at a user device.

FIG. 2 illustrates schematically the application 100 which is provided at the users device 10. The application 100 has a device interface 110 which enables the application 100 to interface with components of the device 10. The device 10 is illustrated as having a location module 180, a content storage module 190 and a display device 170. However, the device 10 will have other features which are commonly known in user devices 10 and which are not described herein. For example, the device 10 is provided with at least one processor which is not illustrated. The processor may be utilised by the application 100.

A control module 150 of the application 100 has access to a server interface 120 which interfaces with the server 30 in this case via a mobile data network 20. Furthermore, the control module 150 has access to a research data storage module 175, a temporary content storage module 185 and a content storage module 195. In one embodiment the content storage module 195 is not required since the control module 150 has access the content storage module 190 provided at the user device 10 via the device interface 110.

Figure 3:
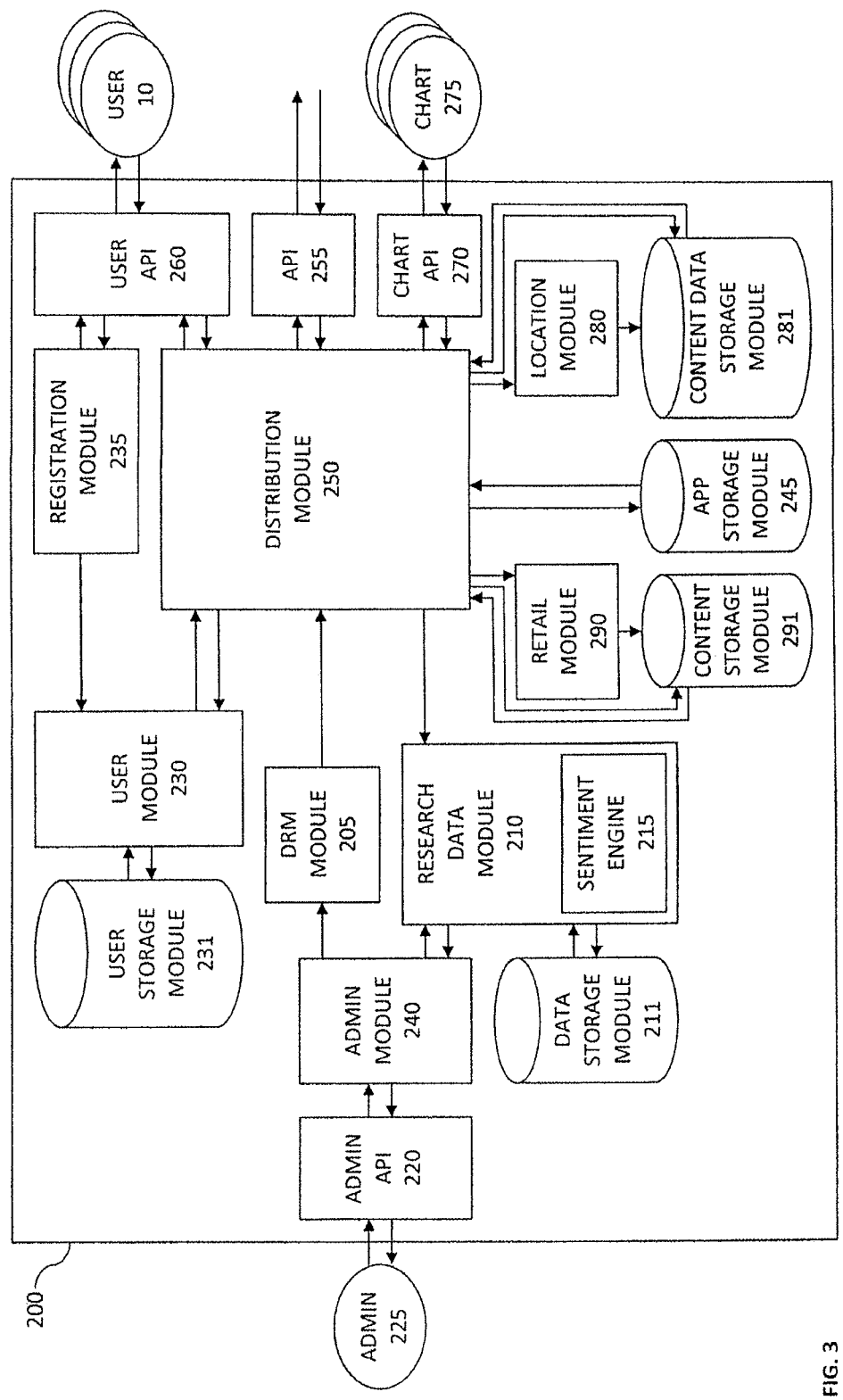
FIG. 3 illustrates schematically apparatus provided at a server.

FIG. 3 illustrates schematically the apparatus 200 provided at the server 30. The apparatus 200 comprises a user interface 260 for interfacing with a plurality of user devices 10 via the internet/mobile network 20, an interface 255 for interfacing with one or more applications which provide functionality not provided by the server 200 via the internet/mobile network 20, and a chart interface 270 for interfacing with one or more of different chart providers 275 over the internet/mobile data network 20. The user interface 260 is connected to a registration module 235 which itself is connected to a user module 230 having access to a user storage module 231. When the user registers with the server 200, user information provided by the user is transferred from the user device 10 to the registration module 235 via the interface 260. The registration module transfers the user information to the user module which stores the data in the user storage module 231. In one embodiment, registration of the user is automatic during installation or first use of the software. In such cases, the control module 150 sends the registration module 325 a suitable user identifier, for example the user's unique MSISDN and, optionally, also the make and model of the user's device. The user is not required to have a PC to register and use the application 100.

In addition, the user interface 260, interface 255 and chart interface 270 are all connected to a distribution module 250. The distribution module 250 is capable of accessing a content storage module 291, an application storage module 245 and a content data storage module 281. The content storage module 291 may also be accessed via the retail module 290, and the content data storage module 281 may also be accessed via the location module 280. The distribution module 250 is connected to the research data module 210 which has access to a sentiment engine 215. The research data module 210 also has access to a research data storage module 211. An administrator module 240 which is accessible via an administrator interface 220 to at least one administrator 225 is also capable of accessing the research data module 210. This enables an administrator to configure research data to be monitored and recorded within the research data module 210. The administrator module 240 is also able to access the DRM (digital rights management) module 205 which has access to the distribution module 250.

If the user device 10 is not provided with the application 100 before the user device is shipped, then the application can be downloaded from a link using a suitable wired or wireless communications protocol, for example the user device application 100 may be retrieved from server 30 via the user interface 260 and the internet/mobile network 20. In order to obtain a copy of the application 100, the user is connected via the internet/mobile network 20 to the server 30. The users device 10 interfaces with the apparatus 200 provided at the server 30 via the user interface 260. A request for the application is provided from the user device 10 to the distribution module 250 which accesses the application held in the application storage module 245 and transfers it to the user device 10 via the user interface 260 and the internet/mobile network 20.

The application 100 may support two or more subscription levels, for example the first may be a "free" or "limited function" version that may have limited content such as a limited chart, such as a top 10 only, and/or may have limited content access permissions, such as one or more songs within the chart can only be accessed and played once by the user. In addition, the application may be available as a "paid for" "or "fully functional" version which has a more complete chart or perhaps a selection of different charts, such as the top 40 in US and top 40 in the UK, and one or more items of content within the chart have greater user access permissions, for example, four plays of each content or continuous play within a defined time period.

In one embodiment the apparatus is configured to send content samples, for example an extract from any piece of content that is defined as a 'preview' and meets the licensing and publishing requirements to be deemed as so. Such track samples may be played or otherwise consumed a finite number of times or repeat played for a predetermined duration or permission to use may be based on a combination of consumption events.

In one embodiment, the consumption permissions of each track are related to the chart position. For example a track in the top 10 may have more limited access permissions than a track appearing outside the top ten. In such a case, a track outside the top 10 or under a particular promotion may be priced lower than a track inside the top 10. Alternatively, or in addition, the consumption permission are set up by an administrator based on promotions intended to be offered.

In one embodiment, the user may be required to pay for the application. In this embodiment, the distribution module 250 passes the user to a payment server (not illustrated) provided separate from the server 200. The payment server may be accessed via the interface 255. Payment servers are known to a person skilled in the art and consequently are not described in detail in this application. However, in one embodiment the user may be required to enter their credit card details and/or, where appropriate, a password in order for their payment to be verified. Following verification of payment, the distribution module 250 will then transfer the application from a storage module 245 to the user device 10 and activate it or just activate the application if it is already installed on the user device. Following activation of the application 100 according to the subscription level, the user is able to access all of the functions available at the server 200.

The user may select one or more of a plurality of different charts to access. The charts, with reference to songs, maybe for example, the top 40 R&B tunes, the top 40 classical tunes, the top 40 pop tunes, etc. The user may also select one of the plurality of charts based on their location, for example, the top 40 charts in Germany may be different from the top 40 charts provided in the UK or the US etc. Therefore, the user can access a chart relevant to their location and their tastes. The distribution module 250 receives the chart data via the chart interface 270 from a plurality of different chart providers 275. The distribution module 250 then provides the relevant chart to the user via the user interface 260. The user selected chart is provided to the user together with permission information setting out the users permissions to access the content (in this case songs) itemised in the chart. The permissions may indicate for example, the number of times the user can play each song within the chart or a duration within which the user can play each song in the chart an unlimited number of times, whether the user can share the songs detailed in the charts with other users, etc. The permissions are defined in the DRM module 205 and will be explained in further detail below.

In preferred embodiments, the content is configurable with default permissions for each of a number of user subscriber levels. A user level record for each user then records the consumption behavior (e.g. a list of events by content item) associated with each user. The events recorded include the user's own consumption events by track and optionally also events associated with social network friends. Such an approach enables administrators to set up permissions by track and the user level records can then be used to set up and monitor individual entitlements. For example, if a track falls out of the top 40 and comes back in again later a user may only get remaining plays of their permitted entitlement. In other words, if they had entitlement to listen to, play or otherwise consume a media file 5 times and listened to it 3 times before it dropped out of the charts, then if it re-enters the charts, the user may only be entitled to listen to, play or otherwise consume the media file twice before buying it. The permissions and/or pricing may be adjusted from time to time or periodically, and optionally automatically, based on how often a user consumes content. The sentiment engine can access the user level records of consumption events and/or monitor the consumption events and modes directly, as will be explained later.

In one embodiment, the apparatus operates changing permissions based upon the degree to which a given user influences the consumption of other users. For example, the user level record can record data on the number of consumption events by social network friends of the user, or more specifically may record the number of consumption events by social network friends with whom the user directly shared the track. In such records, consumption events include any mode of consumption, for example any type of play, purchase or share of a track or a sample.

As noted above, records of consumption events may be used to select individuals or groups of individuals for particular treatment such as being sent an offer for discount, voucher or free gift redeemable in a (physical or online) store. Users might be provided with ID whereby their store purchases, preferably in designated participating stores, can be associated with their ID and they can then be rewarded. A reward might take the form of extra content or extra rights over content already delivered.

Individuals might be selected for particular treatment on various bases such as social network or other group membership, type of device owned etc. Any combination of use data and other user-related or group related information may be used to select a user or group of users for particular treatment.

It will be appreciated that records of consumption events may be used for targeted advertising to particular users. This is another form of particular treatment. For example, a user might be notified of a concert performance of a band he is known to listen to frequently.

In some embodiments, the nature of the consumption event is also recorded such that more weight can be afforded to events like purchase. For example, in one embodiment, each event recorded by the sentiment engine 215 receives an allocated point score; for example tagging may equate to one point, whereas as commentary may equate to 3 points, a play may equate to 3 points and a purchase to 5 points. Score data can be analysed and interpreted by research data module 175 in order to generate reports that can be provided to interested parties and which denote the popularity of content such as music based on user behavior, including, but not limited to, tagging, commentary, plays, purchases and others.

In one such embodiment the apparatus automatically (dynamically) adjusts permissions based on user influence data after predetermined periods or at predefined influence levels. Alternatively, or in addition, the apparatus may adjust pricing of subscriber levels or content items to individual users in dependence upon their influence data.

This may allow administrators to alter how much users are charged (up and down) for the purchase of any given content.

The user is able to view the chart via the display device 170 at the user device 10. In one embodiment, the display device is a touch screen, such that user selections can be transferred from the display 170 to the sever 200, via the application 100. In another embodiment an input device (not illustrated) is provided at the device 10, such that the user can input selections.

As stated previously, the chart data is provided to the distribution module 250 from the plurality of chart providers 275. However, the content of the chart i.e., the data files corresponding to each item within the chart is held in the content storage module 291 at the server 200. The content, for example songs (although not limited to songs because it could be games, videos, etc) may be stored in the storage module 291 in a known format such as MP3 files. However, the distribution module 250 prior to transferring each item to the user device 10 may adjust the format of each item into a proprietary format (not MP3 format or any other format recognized by commercially available digital music players). Alternatively, the content may be stored in storage module 291 in a secure proprietary format. In either case, the user is only able to access each item in accordance with the permissions granted and cannot save each item to their storage module 190/195 at the user device 10 for unrestricted use by a content player of the user device.

In one embodiment, the distribution module converts the content item into a secure format only capable of being played by the application 100 of the end user device. In preferred embodiments either the distribution module or the application 100 is configured to convert the secure format into a commercially available digital format for example in response to a purchase event at the user device or in response to a consumption permission change at the server 30. For example, the apparatus and user device may be configured to convert a content item from a secure format into a format compatible with music players in response to a user purchasing a track. This is so that the user can enjoy the relatively unfettered benefits of purchasing and owning a track and including it in his or her own content library, such as a digital music library, subject to no more than the normal restrictions that apply to copyright materials in other words it is permanently available to be consumed by the purchaser.

The user may be provided with an option to purchase each item within the chart. If the user selects to buy one or more of the items within the chart the user is transferred to a payment server via the interface 255. Upon confirmation of payment, the user is then transferred the item from the content storage module 291 via the retail module 290 in an non-proprietary format (i.e. as a MP3 file or using another appropriate format) such that the item can be saved to the content storage module 190/195 at the user device 10. Although this example indicates that the conversion from secure proprietary format to a widely recognized format occurs at the server, some or all of this conversion could also occur at the user device. To ensure the server knows the type of content player the user device is provided, a short piece of code can be run to discover this during registration. Alternatively, the user can play the content item via a content (in this example music) player provided as part of the application 100.

The retail module may also enable a subscriber to purchase tickets for items. The tickets may be delivered electronically and identify a purchased item by a suitable identifier. The identifier may comprise a 2D or 3D barcode and may include a European Article Number (EAN). This may be used to purchase content and other items.

In certain embodiments, purchasing a content item causes DRM unlocking (by whatever mechanism is employed) and causes the apparatus to email a link enabling download of the purchased content item to the user device. In one embodiment, the content item is delivered instead to a set-top box or similar user device, optionally integrated with a television or other media player.

In various embodiments, the conversion from secure proprietary format to a recognized music player format is triggered by event or processes in addition to or other than purchase. For example such conversion may be triggered according to permission rules based on predetermined events. Such permission rules may be stored for example in DRM module 205. The conversion itself can be achieved by any suitable means. For example in one embodiment, the apparatus 200 may hold two versions of each content item. The first version is the secure proprietary version that can only be played by the application 100. The second version is the recognized player format version that can be played by commercially available content players as well as the music player provided within the application 100 and which is unconstrained in terms of consumption permissions defined in the DRM module. In this example, the proprietary secure format item is switched with the recognized player format version of the relevant item responsive to the trigger event.

In another embodiment, conversion amounts to the content file extension being changed from a proprietary file extension to the appropriate recognized player extension so that the user's device player can recognized and play the track from a content library on the user's device without being constrained by the permissions defined in the DRM module 205 and usually enforced by the application 100.

In another embodiment, known types of encryption and decryption are used to ensure that prior to conversion, the user can only play the content item according the permissions regime of the user as defined in the DRM module 205. This can be achieved by decryption (on the fly or for example buffering decrypted content) ahead of play out by the application 100. After conversion, the decrypted file is available to the user device content player in a recognized format and may be played without being constrained by the permissions defined in the DRM module 205.

In another embodiment, the distribution module 250 may be provided with a fragmentation module 252. The fragmentation module encrypts each item prior to transferring it to the user device 10, such that each item can only be used in accordance with the associated permissions. When transferring each item of content from the content storage module 291 to the user device 10, the fragmentation module fragments each item into a plurality of components. Each item may be fragmented such that each fragment relates to a different frequency range. For example audible sound (audible to humans) is possible in the range 20 Hz to 20,000 Hz. Therefore a track may be fragmented into a plurality of constituent parts, each part relating to a different sub-range of frequencies. In one example, the item is fragmented into five constituent parts, the first comprising the range 20 Hz-4,000 Hz; the second comprising the range 4,000 Hz-8,000 Hz; the third comprising the range 8,000 Hz-12,000 Hz; the fourth comprising the range 12,000 Hz-16,000 Hz; and the fifth comprising the range 16,000 Hz-20,000 Hz. The fragmented item is then transferred to the users device 10, together with a key indicating how the item is to be reconstructed. The key would be unique to the user and delivered daily with their content. It may comprise of a combination of their MSISDN, the ID of the media files and instructions to assist the application in recompiling the fragmentation of the media file so that the player understands how to reassemble the media file with the correct levels as described above.

When the fragmented item is received at the user device 10, the control module 150 reads the key and reconstructs the item such that it can be listened to, played or otherwise consumed at the users device 10 in accordance with the permissions applied within user device application 100. In one embodiment, the control module 150 reconstructs the item, in accordance with the key, when a user selects to play the item, such that the fragments of the item are played simultaneously.

In one embodiment, each item of data is fragmented into a different arrangement of constituent parts. For example, in the above example the item is fragmented into five equal constituent parts. However, each item may be fragmented into a much larger number of different number of constituent parts and the fragments are not required to be divided equally. Each item may be fragmented differently in terms of frequency and/or time. Since each item is fragmented at the sever 200, the user device application 100 needs the key defining how each content item should be reconstructed and played. The application 100 applies the key in accordance with the user's permissions and plays the content item out where the user has the appropriate entitlements.

Since the fragmentation is applied at the server, it is not possible for the user to save each item to their device 10 in a format recognizable by an ordinary commercially available content player, without first purchasing the item. However, following purchase of an item, the content item is converted by being reconstructed at the user device by the control module 150 using the relevant key, and then the reconstructed item is stored in the content storage module 190 of the user device 10 in a widely recognized non-proprietary format, for example as an MP3 file.

The user may also be provided with an option to tag one or more of the items within the chart for purchase at a later time/date. When a user tags a file, the user application locally stores a short sample of the media file, so that the user can listen again to the sample or otherwise consume it a predetermined number of times and for a predetermined period of time. The chart is provided to the user device 10 and stored in the temporary content storage module 185 by the control module 150 at the device 10. The temporary content storage module 185 is used to store the items which are received in a proprietary format from the server and which are associated with consumption permissions defined in the DRM module 205, for example temporary consumption permissions.

If the user selects to tag one or more item for purchase at a later time/date then the control module 150 associates a tag with the item in the temporary content storage module 185. The control module 150 may then provide the user with periodic reminders to buy the item. The control module 150 may also transfer the users tagging of one or more item for purchase at a later time/date to the server 200. This information may be stored in the user storage module 231 and/or the content storage module 291, such that the distribution module 250 may provide the user with periodic reminders to buy the item.

In one embodiment, the user is also able to share the items within the chart with their friends. In this embodiment, the user is able to transfer for example the item in proprietary format or a link to the server 200 with the appropriate access permissions, to a friend. In order to do this, the user selects to "share" one or more of the items. In one embodiment, this implemented by sending messages through known and established social networks, such as Facebook™ or Twitter™ or MySpace™, or through email. The share recipient can then either play it on his her own version of the application (downloading it if required) or consume it via a stream from the server 30. The user may also share media content within local area networks, or for example via Bluetooth. In one embodiment, a user can stream directly from his user device to another user's device via a link established between user applications running on the respective devices.

When a user tags a content item, network contacts (e.g. friends on their social networks) are able to see that they have tagged those media files. Similarly, such contacts can see which content items individuals among their network contacts have tagged.

In another embodiment a first registered user of the system may give permission to a second registered user of the system to access and stream content stored on the first users system over local networks or similar (i.e. Bluetooth) to the second user's system such that the rights of consumption entitlement defined in distribution module 250 for the first user are recognized and updated when the second user accesses and consumes that content. Moreover when the second user accesses and consumes that content, for example over a LAN, sentiment engine 215 records the consumption of that content and both the first and second user are associated with consumption of that content; for example this can be handled by sentiment engine 215 and/or research data module 210 and stored by research data storage module 175. In such cases both the sender and the receiver user application would inform the apparatus 200 via user API 260 of the relevant information.

Figure 4:
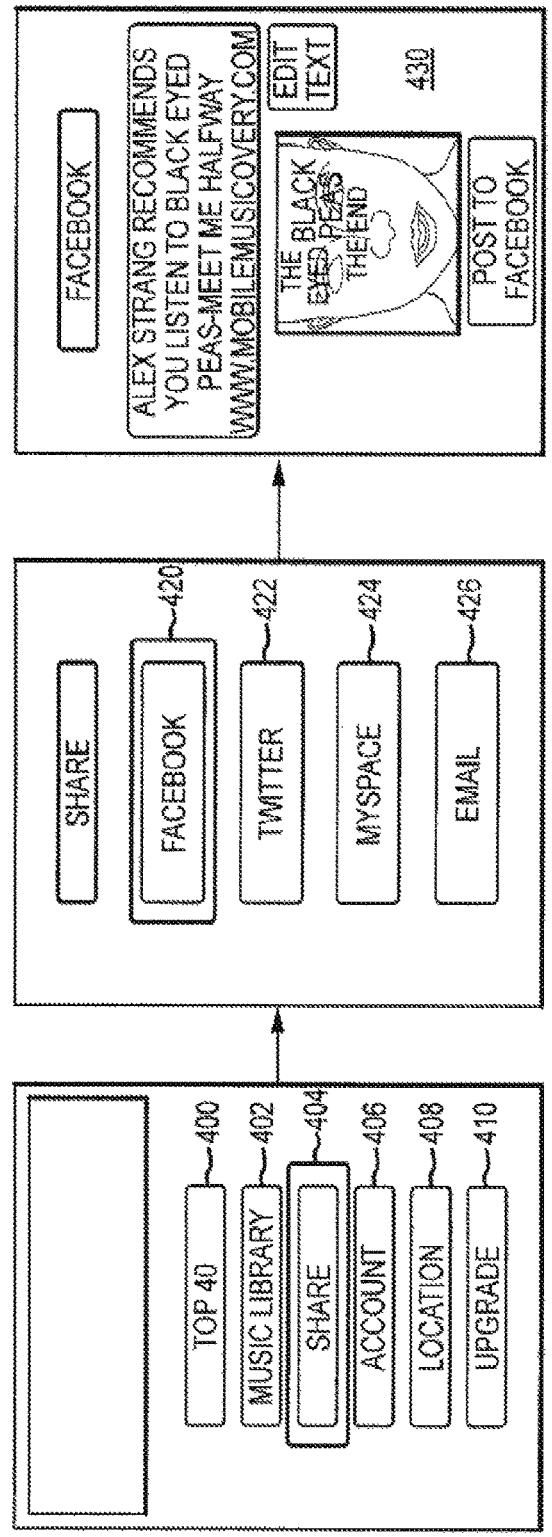
FIGS. 4-7 illustrate screen shots as they might appear on the user device.

FIG. 4 shows a screen presented to the user by the application 100 running on the user device 10. The menu options include options to click on: Top 40 400; the user's own music library 402; sharing functions 404; account set up 406; location services 408; and upgrade 410.

Figure 5:
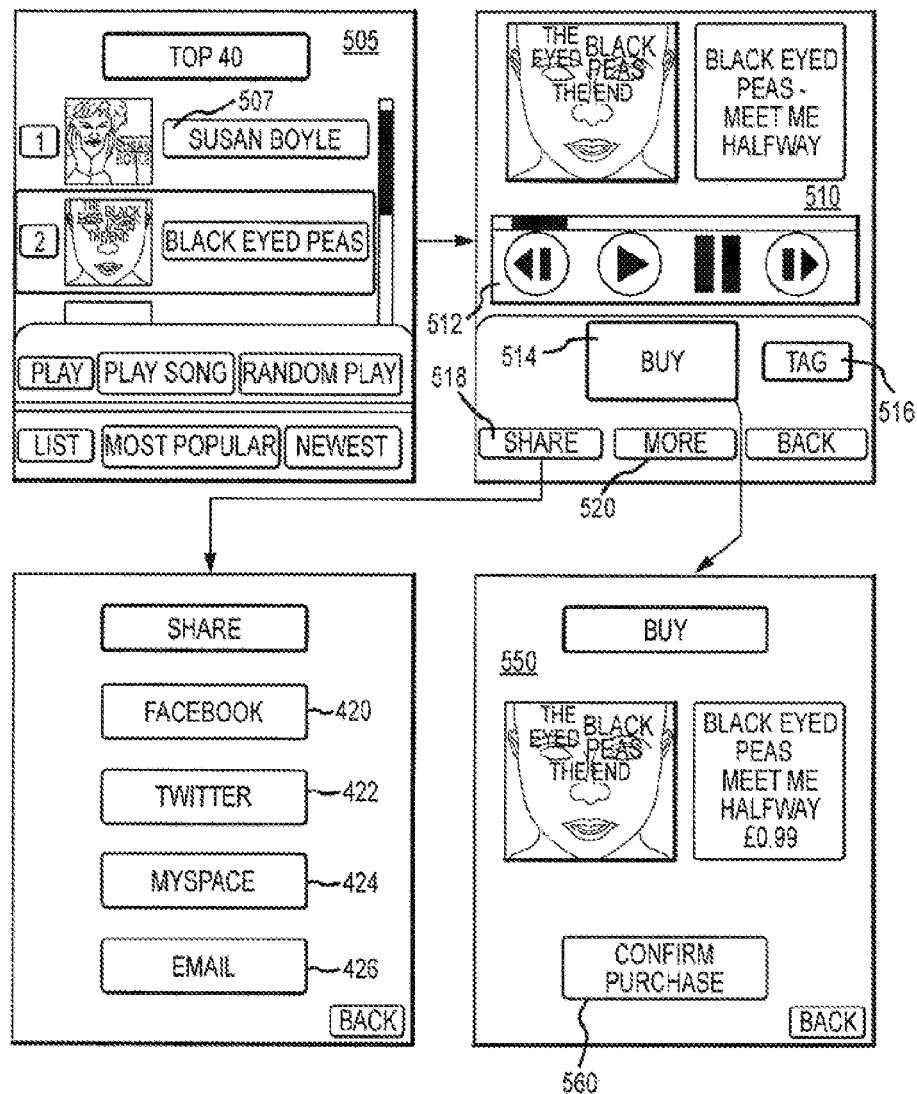

Selecting on Top 40 takes the user to screen 505 of FIG. 5 on which the chart list in this example is presented with highest positioned track 507 at the top. There are options to play individual tracks according to the subscriber permissions and filter to focus on tracks that represent the new chart entries. Pluralities of tracks can also be played for example based on popularity or randomly, according to permissions recorded in the DRM module 205. Selecting a track from this screen takes the user to a track level screen 510, with a control panel 512 incorporating buttons for forward, reverse, play and pause. This track level screen also presents buttons for buy 514, tag 516 and share 518. Selecting buy takes the user to a purchase confirmation screen 550 where the purchase of the track can be confirmed with a single click 560.

Figure 6:
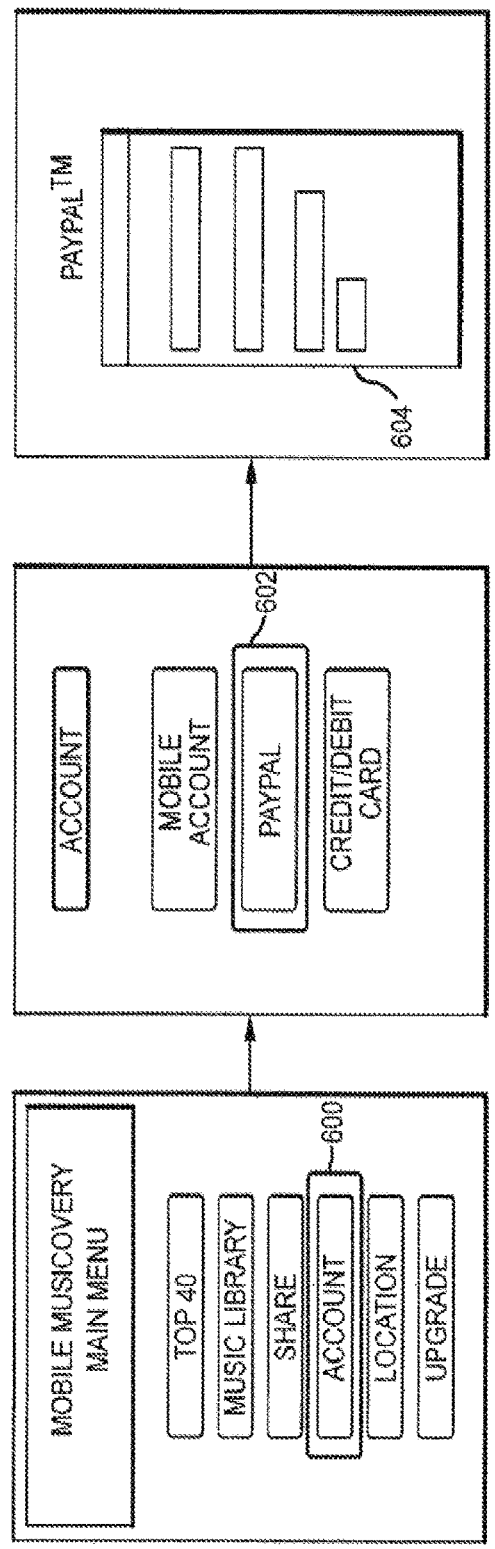

FIG. 6 shows how one or more payment mechanisms can be set up in advance. The user selects account 600 and then his or her preferred payment mechanism; in this example PayPal™ 602 is selected from a list also including mobile telephone account and financial transaction card. The user then enters particulars 604 for the payment mechanism selected and these are passed to the Apparatus 200 and stored there, both in a secure manner.

Figure 7:
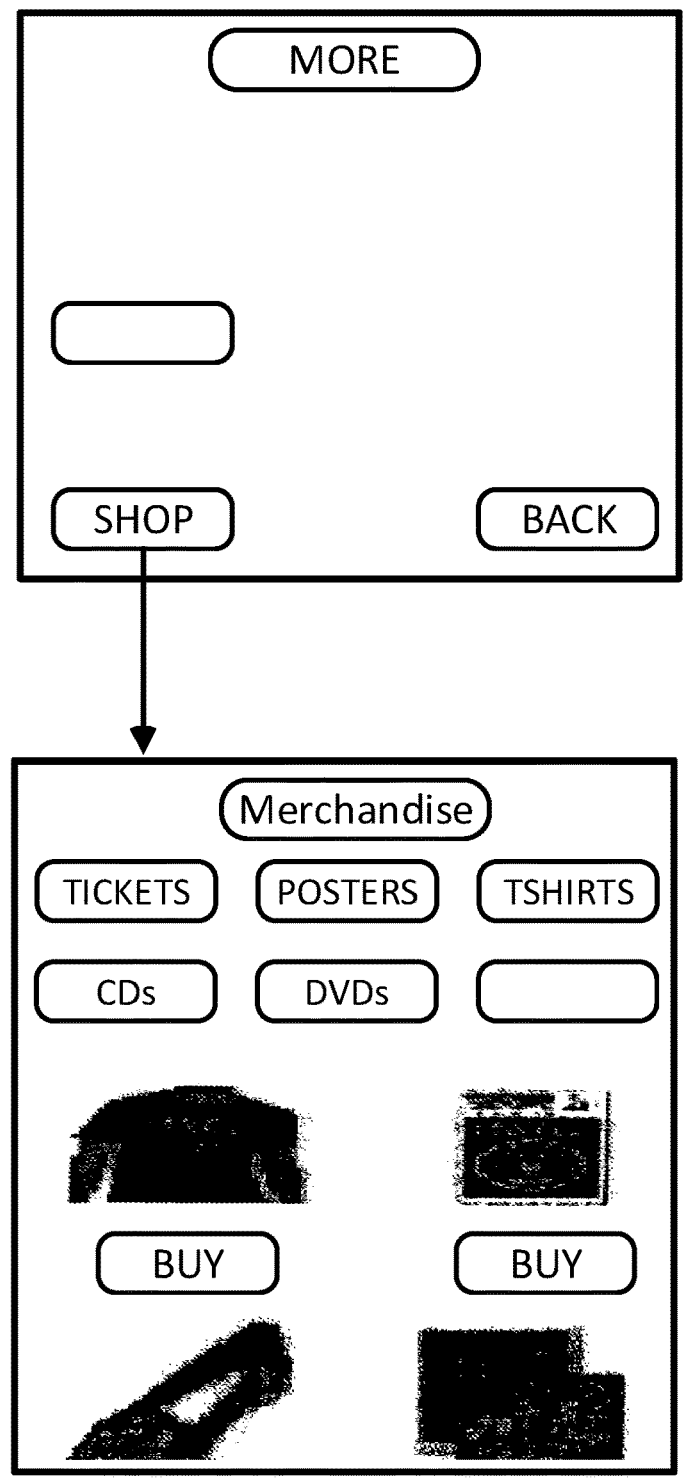

If the user selects More 520 on the track level screen 510, the user is directed to merchandising pages like those shown in FIG. 7, where the user can buy merchandise or tickets related to the track. They should also be shown more media files available for download.

FIG. 4 also shows that selecting share directs the user to Facebook™ 420, Twitter™ 422, MySpace™ 424, and email 426 options, and a further click enables user access to their sharing technology, in this case Facebook pages 430. To facilitate this sharing the user may be directed to enter username and password, or other equivalent particulars, as part of the application set-up process. This enables the server 200 to set up and configure relevant Application Program Interfaces (APIs) 255 for sharing such that the sharing indicated at the user application 100 can be implemented via the server 200 and in this case the distribution module 250 and allow the share recipient to download or stream the content in dependence on the permissions applying to the share event.

When sending messages and or sharing via the application 100, the user may comment on the content (for example express a sentiment: like, dislike, love etc). Likewise, messages of one type or another expressing sentiment may be returned to the sender's application 100 from the share recipient via one or more social network or messaging technologies. Also, friends of the sender or receiver may leave a comment regarding the item shared on the social networking site. The information that the user has selected to share the item and with how many friends the user has selected to share the item is transferred by the distribution module 250 to the research data module 210. In addition, any comments provided by the recipient and any comments provided by any of the users friends regarding the item may be transferred via the interface 255 and the distribution module 250 to the research data module 210. The research module makes the data anonymous (strips out and discards identity information) and stores it in the data storage module for analysis by the sentiment engine.

Whether and how the user is allowed to share each item may be defined in the permissions associated with each item. In addition, the permissions may indicate how many times the user is permitted to share the item (i.e. how many people the user can share the item with) and how many times the shared person to whom the user has shared the item can listen to the item/share the item with further friends. For example, each item may be provided with permissions enabling the user to listen to, play or otherwise consume the item four times. If the user shares the item with one friend, in this instance the friend may be provided with permissions to listen to, play or otherwise consume the item twice and the users permissions to consume the items maybe reduced to two. In total, the overall consumption permissions of four is maintained. In another embodiment, each item may be provided with permissions enabling the user to consume the item four times. If the user shares the item with one friend, in this instance the friend maybe provided with permissions to consume to the item four times as well and the users permissions to consume the item are unchanged.

In addition, data regarding purchase and/or tagging of an item within the chart by a user maybe stored in the research data storage module 175 at the user device 10. This data can then be transferred to the server 200 via the user interface 260. Upon receipt of such research data, the distribution module 250 transfers this data to the research data module 210, at the server 200, which stores it in the data storage module 211.

The research data module can be configured to store for example module metrics including one or more of: the number of purchases by track; the number of plays by track; the ratio of plays to purchases by track; the average duration of play by track; sharing events by track; who is sharing; the ratio of shares to purchases; the timing of plays throughout a 24 hour local time period; duration of use of the user application; geographical stamps; average number of plays of a track by a user; tagging and sentiment of messaging in relation to a track.

The user may also be provided with an option to request further information about one or more of the items within the chart. In this instance, the request is transferred from the user device to the distribution module 250 at the server 200. The distribution module 250 retrieves data associated with each item of content from the content data storage module 281 and transfers the relevant data to the user device. This data may include information such as information regarding performances to be held by the artist etc and related merchandise that is commercially available.

In one embodiment, the location of the user device 10 may be determined by the location determination module 180 of the device 10. It is becoming more common for mobile devices to be provided with location modules which can determine the current location of the device, for example using GPS or cell location data. The location of the device maybe transferred via the control module 150 to the distribution module 250 at the server 200. This location information is then transferred to the location module 280, which retrieves content information from the content data storage module 281 based on the location of the user. For example, if the user is in London, the information regarding events to be held by the artist maybe limited to the London area. In addition, if the user is located in the UK, then the information about events maybe limited to the UK etc. In addition, the information maybe limited to a 5, 10, or 20 mile radius surrounding the location of the user etc. In one embodiment, the user is able to prevent transfer of their location to the sever 200. More than this, the system uses geo-location so that if the user is in an area known to be where a genre of music (e.g. Rock) is popular then they may receive more of that genre of music. This information may be generated through a combination of geo-location, market intelligence through postcode data such as Mosaic, transaction data and others.

As mentioned above, the user may also be provided with an option to be transferred to a merchandise server selling merchandise connected to the artist of the item which the user has selected for more information. The distribution server redirects the user to the merchandise server via the interface 255. Such information may include promotions and/or live events and/or merchandise related to the track.

For example, either or both of the live performance and merchandise information may be filtered and/or prioritised taking into account user's current location data.

The user may also be provided with rolling news along the bottom, top, or, for example, down the side of the display 170 of the mobile device. The rolling news may provide information associated with the item which the user is currently listening to/looking at on the user device. This information may be provided from the content data storage module 281 via the distribution module 250. The information contained in the content data storage module 281 maybe updated via information from the chart providers 275 or maybe provided from alternative providers via the interface 255.

Information regarding: whether the user has selected to listen to or otherwise consume an item; how many times they have listened to or consumed the item; whether they have listened to or consumed the item in quick succession a plurality of time; whether the user finished listening to the item and if not where in the item the user listened up to; whether the user purchased the item; after how many listens the user purchased the item; whether the user shared the item with a friend(s); any comments the user/friend provided regarding the item; how many times each friend has listened to the item and/or shared the item; whether the user/friend has accessed the additional information regarding the item and/or purchased merchandise regarding the item; information regarding the geographical location of the user/friend who is listening to the item; the time of day the item is being listened to or otherwise consumed etc. may all be transferred to the research data module 210.

Information regarding the users actions in relation to the item maybe temporarily stored in a research data storage module 175 at the device 10 prior to transfer to the server 200. This data maybe cleaned of information identifying the user by the distribution module 250 prior to transfer to the research data module 210 or the information maybe cleaned at the research data module 210. In this way, no personal information regarding the user is stored. The research data may be transferred to the sever, when the application 100 provided at the user device connects to the server in order to update the charts.

The research data module 210 comprises a sentiment engine 215. The sentiment engine 215 may analyse any comments left by user and/or friends of the user regarding the item to determine the sentiment of the comment, i.e., whether the user/friends of the user liked or disliked the item. This data maybe stored in the data storage module 211. The research data may then be transferred to the administrator module 240 which transfers the research data to an administrator 225 using the administrator interface 220. In this way it is possible for an administrator 225 to obtain information about different users interaction with the content enabling them to provide more relevant/desirable content. The administrator 225 may also use the administration module 240 to define the permissions relevant for each item of content.

An interface may be provided to allow access by an administrator or operator to user information. This information may include subscription details, user name, password, and other details such as devices used/owned, content purchases made and advanced consumption information. This interface may be provided as part of the administration module. Alternatively user support may be provided by a third party. Either way this interface may be browser based. The administration interface can be used for a number of purposes including handling any required refunds and resending purchased tracks for example.

Similarly a user may be provided with an interface to allow a user to access to his or her user information. In the preferred embodiment the information available to a user is a subset of the information available to an administrator. For example the administrator might have access to more advanced consumption information. The user interface, which again might be browser based, might enable a user to perform such tasks as resetting a password, reviewing consumption data, determining remaining permissions and other management tasks.

The permissions are defined in the DRM module 205. Upon request for chart data, the distribution module 250 obtains a chart from one of the plurality of chart providers 275 and combines it with content from the content storage module 291 and permission data from the DRM module 205 prior to providing it to a user 10.

The chart providers may be sources of well known charts. Alternatively the apparatus may permit charts to be compiled that are tailored to the preferences of users or groups or users. Thus the chart providers may be internal or external to the apparatus. A user interface may be provided for an individual chart compiler.

Regardless of the manner in which the chart, i.e. the list of content, is compiled, a process of ingesting the content may be necessary.

In the preferred process, having received a chart, a check is then made to determine whether the content items listed in the chart are available. This may include checking whether they are already in the storage module 291 and/or checking whether their distribution is permitted. Any items not in storage module may have to be obtained, possibly purchased or obtained subject to licence, for inclusion in the chart. Some of this process may be performed manually.

In one embodiment, when the user selects a content item within a chart to listen to or otherwise consume and/or share the content item is streamed by the distribution module 250 to the user device. Consequently, the content item is not stored at the user device at any point other than within a conventional overwriting buffer module to provide a minimum standard of play quality. Therefore, the server 200 is capable of either downloading or streaming content item from the content storage module 291. When the server 200 is streaming data to the user device 10, then a connection is required between the server 200 and the device 10.

In another embodiment, a user may have plurality of user devices 10 each having an application 100 linked to the server 200. In this embodiment, the permissions set out in the DRM module are determined on a per user basis, using the user data provided by the user and stored in the user storage module 231, for example, the users name, address, email address, mobile device number etc. Therefore, if the permissions define that the user can listen to or otherwise consume a content item four times and they have listened to or otherwise consumed it once already on a first user device, then when using a second or third etc. user device the user will still have three play/consume permissions left.

In one embodiment, the chart is updated at regular periods for example, hourly, daily, weekly or biweekly by the chart providers 275. These updates are transferred by the distribution module 250 to the users. Consequently, items of content which are available in the chart one week may no longer be available in the chart following up dates of the chart. In this instance, regardless of whether the user has utilised all the permissions associated which each item in the chart, if the item no longer exists in the chart then the users permissions will be void. If the user has marked one or more of the content items to purchase later then prior to update of the chart the user will be sent a reminder to purchase the item.

In one embodiment, it is possible for tracks that have been played or shared at least once to be accessed after they have moved out of the charts.

In one embodiment, the chart is updated at the users device at a time period during which there is low traffic flow over the internet/mobile network 20. For example, the updates may be provided at off-peak times, such as over night in a particular jurisdiction.

In one embodiment, when the user is registering with the service at the server 200 and providing user information they may also select from a plurality of social networking sites which they wish to have available to them when using the service provided by the server 200. The users social networking site selections are then stored in the user storage module 231. In one embodiment, the users social networking site selections may be stored with the user name and password for the selected social networking site so the user does not need to enter their user name and password upon each connection to the social networking site. Although in one embodiment, the user may still be required to periodically enter their user name and password in order to confirm identity.

It will be appreciated that permission to access content will lapse or expire in certain circumstances such as the lapse of a subscription, time-out of permission or other lapse or expiry event. Permission may partially lapse. The lapse or partial lapse may be handled in a number of ways. The user may simple receive no more communication relating to the content or related content. One possibility aimed at maintaining a user's interest is to continue to provide to a user with reduced or no access permissions a chart of content items but not to provide any consumable content or to provide reduced consumable content. For example if a user has already purchased one or more content items, the user could be provided with updates of one or more charts in which the content item(s) are present. The user might have the option to click or otherwise select an item in a chart and in response be presented with a reminder to renew a subscription or other permission to consume the content alternatively or in addition to an option to purchase the content. Where there is no permission to consume content listed in the chart, it would be possible to provide with charts samples of content instead of complete content items.

In a preferred embodiment a user is required to subscribe to a service providing a chart of content items which may then be purchased. Purchases are only possible by subscribers. Subscribers have the benefit of being provided with a list of content that has been pre-selected on their behalf. Owners of the rights in the content have the content curated in the sense that permissions applying to the content are implemented. Subject to a subscription being current a user may be provided with immediate downloads or streamed content without having to use a link to obtain the content.

In any of the embodiments described above, the purchase of a content item in electronic form or in the form of software can be linked to a right to own the content in physical or "hardware" form. For example, suppose a user purchases an 'Album' or 'Book' in digital form. This purchase can then be logged as a 'right to own the physical product'. This could be through the provision of a unique code, ID or 2D/3D/EAN barcode or by the association of data generated between the service and a partner's CRM (customer relationship management)/EPOS (electronic point of sale) systems. On presentation of the correct code or at the execution of an event or anniversary of an event the subscriber is entitled to claim the physical product.

The apparatus described above may be implemented at least in part in software. Those skilled in the art will appreciate that the apparatus describe above may be implemented using general propose computer equipment or using bespoke equipment.

Those skilled in the art will appreciate that while the foregoing has described what is considered to be the best mode and, where appropriate, other modes of performing the invention, the invention should not be limited to the specific configurations and methods disclosed in this description of the preferred embodiment. Those skilled in the art will recognize that the invention has a broad range of applications, and that the embodiments may take a wide range of modifications without departing from the inventive concept as defined in the appended claims.

Overall:

Ability to Search—Get more tracks from an artist that you are listening to by clicking a button Recommendation based on what you're listening to or otherwise consuming Search for any piece of music attached for immediate or delayed download Ability to send a song as a gift (embodiment may include purchase or trial/share)

Oldest Charts 1971 December etc. . . . until present day.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods and apparatuses described herein can be executed on a mobile station and on a computing device such as a server. Program aspects of the technology may be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The invention claimed is:

1. An apparatus configured to provide a chart of content items to a plurality of user devices and configured to enable individual users to temporarily access one or more content items listed in the chart, the apparatus comprising:
   a memory; and
   at least one processor coupled to the memory and configured to:
      communicate with user device applications;
      define user access permissions, including temporary user access permissions, relating to individual ones of the one or more content items;
      implement the user access permissions in relation to user devices by making available the one or more content items listed in the chart to at least one user device application;
      determine a first consumption event of the one or more content items;
      associate a first value with the first consumption event;
      determine a second consumption event of the one or more content items, wherein the second consumption event is different from the first consumption event;
      associate a second value with the second consumption event, wherein the second value is different from the first value;
      determine one or more scores indicative of consumer response to the one or more content items based on the first value and the second value; and
      automatically generate a report based on the one or more scores, denoting the popularity of the one or more content items.

2. The apparatus according to claim 1, configured to automatically update the chart of content items delivered to one or more user devices during low levels of network traffic.

3. The apparatus according to claim 1, wherein the temporary user access permissions include temporary availability to a user of at least one content item in the chart in terms of at least a number of plays, a number of streams, a number of shares, and a duration of availability to the user.

4. The apparatus according to claim 1, wherein the temporary user access permissions include temporary availability to a user of at least one content item in the chart and is configured to update the user access permissions responsive to the chart being updated.

5. The apparatus according to claim 1, comprising at least one sharing interface configured to implement sharing of the one or more content items from a first user to a second user according to one of the user access permissions.

6. The apparatus according to claim 5, wherein the sharing interface is configured to operate via one or more of: a social network; and an email client.

7. The apparatus according to claim 5, wherein the sharing interface is configured to carry a message or link establishing content item permissions for a user of the system.

8. The apparatus according to claim 5, wherein permissions established via the sharing interface comprise one or more of: number of plays; number of streams; number of shares; and duration of availability to the user.

9. The apparatus according to claim 1, wherein users are enabled to send messages to each other via the apparatus, and where a research data module comprises a sentiment engine configured to monitor behavior and/or message content for sentiment connected to a content item.

10. The apparatus according to claim 1, wherein users are enabled to send messages to each other via a sharing interface.

11. The apparatus according to claim 1, comprising a research module coupled to the user device application, wherein the research module is configured to receive from the user application metrics comprising one or more of: number of purchases by track; number of plays by track; ratio of plays to purchases by track; duration of play by track; sharing by track; who is sharing; ratio of shares to purchases; timing of plays; duration of use of user application; geographical stamps; average number of plays of a track by a user; sentiment of messaging in relation to a track.

12. The apparatus according to claim 1, comprising one or more of a retail module and a purchase module configured to couple to and receive data from the user device application.

13. The apparatus according to claim 1, configured to convert a content item of the chart from a state of temporary availability on the user device to a state of permanent availability on the user device responsive to a trigger event.

14. The apparatus according to claim 13, configured to recognize as trigger event one or more of: a purchase event; a reward; and an alteration of permissions data.

15. The apparatus according to claim 13, configured to convert a content item from a state of temporary availability to a state permanent availability by one or more of: supplying from the apparatus to the user application a version of the content item in a format recognized by commercially available content players; changing a file extension such that the content item can be recognized by commercially available content players; converting the content item file from a secure format to a format recognized by commercially available content players; decrypting the content item; re-constituting the content item in a format recognized by commercially available content players.

16. The apparatus according to claim 1, comprising a payment module operable to accept payments.

17. The apparatus according to claim 1, comprising a chart interface configured to enable communication with one or more chart providers.

18. The apparatus according to claim 17, wherein the distribution module is configured to receive the chart from the one or more chart providers.

19. The apparatus according to claim 1, further comprising a content data storage module configured to store the one or more items of content data listed in the chart.

20. The apparatus according to claim 1, configured to change a format of one of the items of content data responsive to a trigger event.

21. The apparatus according to claim 1, comprising a fragmentation module configured to encrypt the one or more items of content data prior to transferring the one or more items of content data together with an encryption key to the at least one user device.

22. The apparatus according to claim 21, wherein the fragmentation module is configured to fragment each of the one or more items of content data into a plurality of components.

23. The apparatus according to claim 20, wherein each component relates to a different recorded frequency range.

24. The apparatus according to claim 1, configured to record a user level record of consumption events.

25. The apparatus according to claim 24 configured to transmit some or all of the user level record to a third party device.

26. The apparatus according to claim 1, configured to automatically adjust one or more of access permissions applying to an individual and pricing of content to an individual in dependence upon a consumption event data of that individual.

27. The apparatus according to claim 1, wherein the first consumption event is at least tag the item of content, display the item of content, play the item of content, download the item of content, play sample of the item of content, use the item of content in ringtone, download sample of the item of content, share the item of content with contact, make commentary on the item of content, purchase the item of contents, or receive any of the aforementioned from a network contact.

28. The apparatus according to claim 1 configured to provide a user interface that is accessible via a user device application.

29. The apparatus according to claim 1 configured to provide a user interface for use in obtaining or preparing one or more charts of content items for distribution.

30. The apparatus according to claim 1 comprising storage for content items.

31. The apparatus according to claim 1 configured to provide a user interface allowing access by an administrator or operator to user information.

32. The apparatus according to claim 1 configured to select users of groups of users in a social network for particular treatment.

33. The apparatus according to claim 11 configured to select users of groups of users in a social network for particular treatment and configured to select users or groups of users on the basis of information received by the research module.

34. The apparatus according to claim 1 configured to deliver a chart of content items without the content items to users who do not have permission to use the content items.

35. A method of providing a chart having one or more content items to a plurality of user devices, comprising:
defining, at a server, user access permissions, including temporary user access permissions, relating to individual ones of the one or more content items;
distributing, based on the defined user access permissions, to user devices by making available at the server for transmission to one or more user devices, the one or more content items listed in the chart to provide temporary access to the one or more content items listed in the chart;
determining a first consumption event of the one or more content items;
associating a second value with the second consumption event, wherein the second value is different from the first value;
determining one or more scores indicative of consumer response to the one or more content items based on the first value and the second value; and
automatically generating a report based on the one or more scores, denoting the popularity of the one or more content items.

36. The method of claim 35, further comprising automatically updating the chart of content items delivered to one or more user devices during low levels of network traffic.

37. The method of claim 35 wherein defining the temporary user access permissions includes defining user accesses based one or more of the group consisting of: number of plays; number of streams; number of shares; and duration of availability to the user.

38. The method of claim 35 further comprising converting a content item from a state of temporary availability to a state permanent availability by one or more of the group consisting of: supplying from the apparatus to the user application a version of the content item in a format recognized by commercially available content players; changing a file extension such that the content item can be recognized by commercially available content players; converting the content item file from a secure format to a format recognized by commercially available content players; decrypting the content item; and re-constituting the content item in a format recognized by commercially avail able content players.

39. The method of claim 35 further comprising receiving the chart from one or more chart providers.

40. The method of claim 35 further comprising encrypting the one or more items of content data prior to transferring the one or more items of content data together with an encryption key to the at least one user device.

41. The method of claim 35 further comprising fragmenting each of the one or more items of content data into a plurality of components.

42. The method of claim 41 wherein each component relates to a different recorded frequency range.

43. An article of manufacture comprising: a non-transitory machine readable storage medium; and
a set of executable program instructions embodied in the non-transitory machine readable storage medium that when executed by a programmable system cause the system to perform functions comprising:
defining user access permissions, including temporary user access permissions, relating to individual ones of the one or more content items;
distributing, based on the defined user access permissions, to user devices by making available for transmission to the one or more user devices, one or more content items listed in the chart to provide temporary access to the one or more content items listed in the chart;
determining a first consumption event of the one or more content items;
associating a first value with the first consumption event;
determining a second consumption event of the one or more content items, wherein the second consumption event is different from the first consumption event,
associating a second value with the second consumption event, wherein the second value is different from the first value;
determining one or more scores indicative of consumer response to the one or more content items based on the first value and the second value; and
automatically generating a report based on the one or more scores, denoting the popularity of the one or more content items.

44. The article of manufacture of claim 43 wherein the functions further comprise automatically updating the chart accessible to a user device during low levels of network traffic.

45. The article of manufacture of claim 43 wherein the function of defining temporary user access includes defining user accesses based one or more of the group consisting of: number of plays; number of streams; number of shares; and duration of availability to the user.

46. The article of manufacture of claim 43 further comprising the function of converting a content item from a state of temporary availability to a state permanent availability by one or more of the group consisting of: supplying from the apparatus to the user application a version of the content item in a format recognized by commercially available content players; changing a file extension such that the content item can be recognized by commercially available content players; converting the content item file from a secure format to a format recognized by commercially available content players; decrypting the content item; and re-constituting the content item in a format recognized by commercially available content players.

47. The article of manufacture of claim 43 further comprising the function of receiving the chart from one or more chart providers.

48. The article of manufacture of claim 43 further comprising the function of encrypting the one or more items of content data prior to transferring the one or more items of content data together with an encryption key to the at least one user device.

49. The article of manufacture of claim 43 further comprising the function of fragmenting each of the one or more items of content data into a plurality of components.

50. The article of manufacture of claim 49 wherein each component relates to a different recorded frequency range.

51. A method in a mobile device comprising:
accessing one or more charts provided on a remote apparatus, each chart listing one or more content items;
accessing permission data relating to at least one or more content items in the chart defining how the at least one of the one or more content items may be used by a user of the device;
monitoring use of the at least one of the one or more content items by a user of the device;
determining a first consumption event of the one or more content items;
associating a second value with the second consumption event, wherein the second value is different from the first value;
determining one or more scores indicative of consumer response to the one or more content items based on the first value and the second value; and
automatically generating a report based on the one or more scores, denoting the popularity of the one or more content items.

52. The method of claim 51 in which the permission data defines one or more of:
how the user can play the content item,
whether the user is allowed to share the content item with other users and if so optionally how many users,
number of times the user is allowed to play the content item, and
time period during which the user is allowed to play the content item.

53. The method of claim 51 including recording consumption of content data relating to the at least one content item.

54. The method according to claim 53 wherein the consumption of content data comprises numbers and/or location of consumption events.

55. The method according to claim 54, wherein the first consumption event is at least
playing whole content item,
downloading whole content item,
playing sample of content item,
downloading sample of content item,
sharing content item,
sending message relating to content item,
making commentary on content item,
purchasing content item, or
receiving any of the foregoing from a network contact.

56. The method of claim 53 comprising transmitting the consumption of content data to the remote apparatus.

57. The method of claim 51 comprising storing the at least one content item such that it is accessible only in accordance with the permission data for the at least one content item.

58. The method of claim 51 comprising receiving the at least one content item in a state of temporary availability.

59. The method of claim 58 comprising converting a content item of the chart from a state of temporary availability on the user device to a state of indefinite availability on the user device responsive to a trigger event.

60. The method of claim 59 comprising recognizing as a trigger event one or more of: a purchase event; a reward; and an alteration of permissions data.

61. The method of claim 59 wherein converting a content item from a state of temporary availability to a state permanent availability comprises one or more of: supplying from the apparatus to the user application a version of the content item in a format recognized by commercially available content players; changing a file extension such that the content item can be recognized by commercially available content players; converting the content item file from a secure format to a format recognized by commercially available content players; decrypting the content item; reconstituting the content item in a format recognized by commercially available content players.

62. The method of claim 59 comprising receiving at least one content item in fragmented form and reconstructing the item to enable it to be played on the device.

63. The method of claim 62 comprising receiving, separately from the at least one content item, a key defining how the content item should be reconstructed.

64. The method of claim 51 comprising providing the user with an option to tag a content item for purchase at a later time and providing the user with reminders relating to the content item.

65. The method of claim 64 when dependent on claim 53 in which the group of consumption events additionally comprise tagging of the content item.

66. The method of claim 51 comprising storing content items from the chart for which there are no usage restrictions separately from content items for which use is restricted.

67. The method of claim 51 comprising providing for multiple subscription levels of access by a user to one or more charts at the remote apparatus.

68. The method of claim 51 comprising receiving input user identity information and monitoring use of the at least one content item by multiple users.

69. The method of claim 51 wherein the accessing the chart comprises receiving the chart at the device including multiple content items listed in the chart.

70. The method of claim 51 wherein the accessing the permission data comprises receiving the permission data at the device.

71. The method of claim 69 including requesting a further or updated chart from the remote apparatus and receiving the further and/or updated chart in response to the request.

72. The method of claim 69 comprising performing a battery level check and only requesting and/or downloading a chart and/or updated chart at a time when its battery level is above a certain threshold.

73. The method of claim 69 any of comprising requesting and/or downloading a chart and/or updated chart only when the network traffic levels are known to be below a certain threshold.

74. The method of claim 69 comprising checking the network traffic level and requesting or downloading a chart only when the network traffic levels are below a certain threshold.

75. The method of claim 51 comprising downloading the at least one content item to the device.

76. The method of claim 75 wherein controlling use of the comprising deleting the at least one content item in the event that use of the item is no longer permitted.

77. A non-transitory computer readable medium bearing code which when executed by a processor of a mobile device causes the device to implement the method of claim 55.

78. The non-transitory computer readable medium of claim 77 including a media player for use in playing content items included in the chart.

79. A user device comprising:
 a memory; and
 at least one processor coupled to the memory and configured to implement the method of claim 51.

* * * * *